Nov. 4, 1952     C. L. BOURNE     2,616,318
RESILIENT CLAMP FOR TIRE CHAIN MOUNTINGS
Filed March 5, 1949
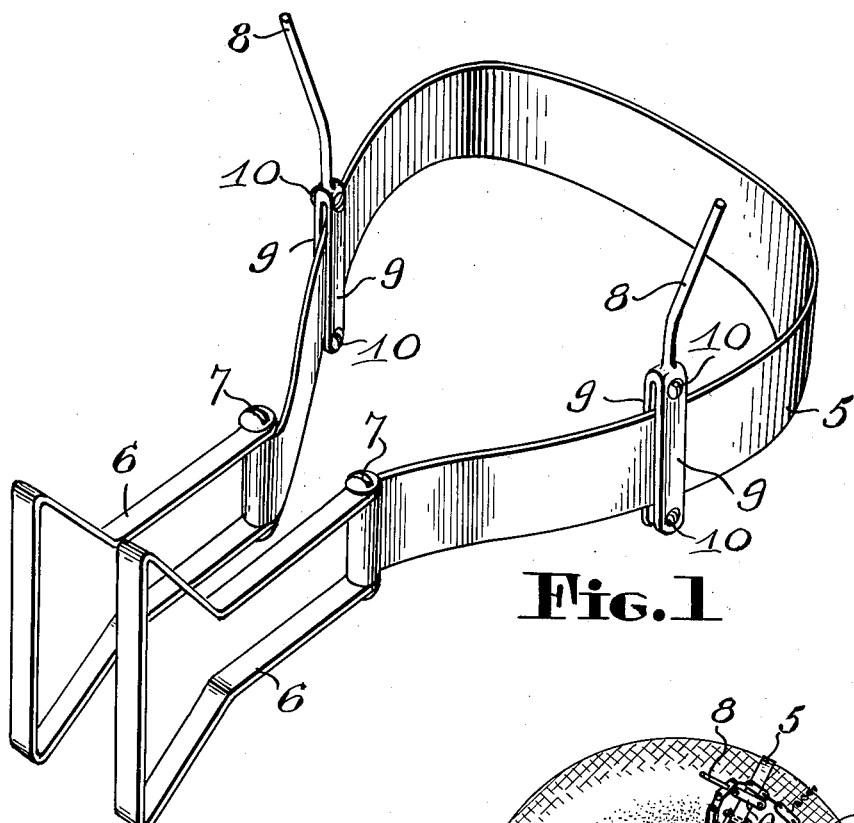
Fig.1
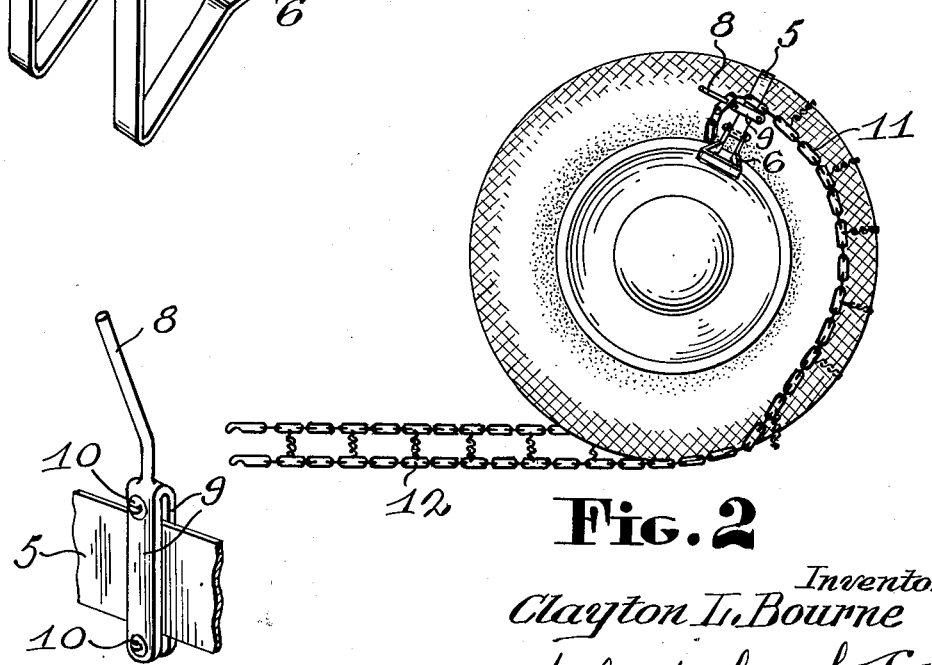
Fig.2
Fig.3
Inventor
Clayton L. Bourne
By Fetherstonhaugh & Co.
Attorney Patented Nov. 4, 1952

2,616,318

UNITED STATES PATENT OFFICE 2,616,318

RESILIENT CLAMP FOR TIRE CHAIN MOUNTINGS

Clayton Lloyd Bourne, Montreal, Quebec, Canada

Application March 5, 1949, Serial No. 79,783

1 Claim. (Cl. 81—15.8)

This invention relates to improvements in tire chain applicators of the type which are spring clipped transversely about the tread and side walls of a tire.

A particular object of this invention is to provide an applicator with prong-like members arranged on either side thereof so that when one end of a tire chain is fitted on the prongs the chain will be quickly drawn about the tire and will be evenly distributed thereabout when the wheel is rotated.

Another object is to provide a tire chain applicator with novel handle members for fitting the applicator in overlapping transverse arrangement about the tread and side walls of a tire.

Proceeding now to a more detailed description, reference will be had to the accompanying drawings, in which:

Fig. 1 is a perspective view of an applicator embodying my invention.

Fig. 2 is a view showing the manner in which the chain is drawn about a tire.

Fig. 3 is a detail view of one of the prong-like members.

Referring more particularly to the drawings, 5 designates a resilient U-shaped spring metal strap adapted to be fitted about a tire. A pair of handle members 6 pivotally mounted at 7 to the free ends of the side arms of the strap swing outwardly to permit spreading of the strap for fitting it about the tire. Release of the spreading tension causes the strap to grip the side walls of the tire by the spring action of said strap.

A pair of prong-like members 8 projecting from the bight portion of U-shaped clamps 9 are arranged to project from one side edge of each of the side arms of the strap. Clamps 9 are secured about the strap by bolts 10, or other suitable means, at opposite side edges of the strap. Each prong-like member is curved outwardly adjacent the clamp to provide clearance between the side wall of the tire and the prong-like member for easy fitting of the chain on said member.

When the applicator is fitted about the tire, as shown in Fig. 2, the end links of the side members 11 of a tire chain 12 are fitted over prong 8. The wheel is then rotated away from the chain to draw the chain about the tire so that the cross links and side members of the chain will be evenly distributed about the tread and on either side of the tire. Handles 6 should be projected forwardly, as shown in Fig. 2, or turned back to lie flatly against the side arms of the strap in an out-of-the-way position.

I claim:

An applicator for tire chains comprising a resilient U-shaped spring strap member adapted to be fitted transversely about the tread and side walls of a tire, a pair of U-shaped clamp members on opposite sides of said strap, said clamps having their leg portions straddling the strap and adjustably secured about said strap with the bight portion of said clamp positioned at one side edge of the strap, and a prong-like chain engaging member projecting from the bight portion of the clamp to lie substantially along the side walls of a tire, said prong-like members being curved outwardly adjacent the clamp to provide clearance between the prong-like member and the side wall of a tire and handle members rotatably mounted on the free ends of said strap, said handle members being swingable outwardly to a position at least at right angles to the strap ends for spreading the strap apart.

CLAYTON LLOYD BOURNE.

REFERENCES CITED

The following references are of record in the file of this patent:

UNITED STATES PATENTS

| Number | Name | Date |
|---|---|---|
| 2,100,819 | Salley | Nov. 30, 1937 |
| 2,159,626 | Boycott | May 23, 1939 |
| 2,166,869 | Lees et al. | July 18, 1939 |
| 2,279,108 | Clifford | Apr. 7, 1942 |
| 2,293,545 | Hewell | Aug. 18, 1942 |
| 2,299,185 | Smola | Oct. 20, 1942 |
| 2,478,335 | Stark | Aug. 9, 1949 |